(12) United States Patent
Oberhauser

(10) Patent No.: US 8,169,619 B2
(45) Date of Patent: May 1, 2012

(54) DETECTOR ELEMENT MATRIX FOR AN OPTICAL POSITION MEASURING INSTRUMENT

(75) Inventor: Johann Oberhauser, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 193 days.

(21) Appl. No.: 12/734,131

(22) PCT Filed: Sep. 27, 2008

(86) PCT No.: PCT/EP2008/008245
§ 371 (c)(1),
(2), (4) Date: Apr. 9, 2010

(87) PCT Pub. No.: WO2009/049761
PCT Pub. Date: Apr. 23, 2009

(65) Prior Publication Data
US 2010/0245839 A1 Sep. 30, 2010

(30) Foreign Application Priority Data
Oct. 20, 2007 (DE) .......................... 10 2007 050 253

(51) Int. Cl.
*G01B 11/02* (2006.01)
(52) U.S. Cl. ........................................ 356/498
(58) Field of Classification Search ................ 356/482, 356/486–488, 493, 494, 498, 499
See application file for complete search history.

(56) References Cited

U.S. PATENT DOCUMENTS

| | | | |
|---|---|---|---|
| 4,827,145 A | 5/1989 | Arques | |
| 5,184,018 A | 2/1993 | Conrads et al. | |
| 5,444,234 A | 8/1995 | Hennerici et al. | |
| 6,031,619 A * | 2/2000 | Wilkens et al. | 356/419 |
| 6,727,493 B2 | 4/2004 | Franklin et al. | |
| 7,199,354 B2 * | 4/2007 | Mayer et al. | 250/231.13 |

(Continued)

FOREIGN PATENT DOCUMENTS

| | | |
|---|---|---|
| DE | 40 02 431 A1 | 8/1991 |
| DE | 43 32 859 A1 | 3/1995 |
| DE | 197 54 626 A1 | 6/1999 |
| DE | 197 54 626 C2 | 10/1999 |

(Continued)

*Primary Examiner* — Patrick J Connolly
(74) *Attorney, Agent, or Firm* — Brinks Hofer Gilson & Lione

(57) ABSTRACT

A detector element array for an optical position measuring instrument, by way of such array a fringe pattern resulting in a detector plane can be converted into electrical scanning signals. The detector element array includes a plurality of light-sensitive detector elements disposed in matrix-like fashion in rows and columns. The plurality of light-sensitive detector elements include a first detector element in a first column of the columns, a second detector element in the first column that is adjacent to the first detector element and a third detector element in a second column of the columns that is adjacent to the first column, wherein the third detector element is diagonally adjacent to the first detector element. The detector element array includes a first switch that selectively directly connects the first detector element with the second detector element and a second switch that selectively directly connects the first detector element with the third detector element. The detector element array includes a memory element associated with the first detector element, wherein memory element information is stored in the memory element that indicates which of the second and third detector elements is connected to the first detector element in an established scanning configuration, wherein no more than the first and second switches are associated with the memory element.

18 Claims, 7 Drawing Sheets

U.S. PATENT DOCUMENTS

| | | |
|---|---|---|
| 7,381,942 B2 | 6/2008 | Chin et al. |
| 2004/0153283 A1* | 8/2004 | Wargon .......................... 702/156 |
| 2006/0043272 A1* | 3/2006 | Mayer et al. ............. 250/231.13 |
| 2007/0170355 A1 | 7/2007 | Chin et al. |
| 2010/0245839 A1* | 9/2010 | Oberhauser .................. 356/498 |

FOREIGN PATENT DOCUMENTS

| | | |
|---|---|---|
| EP | 1 308 700 A2 | 5/2003 |
| EP | 1 630 528 A2 | 3/2006 |

* cited by examiner

DETECTOR ELEMENT MATRIX FOR AN OPTICAL POSITION MEASURING INSTRUMENT

Applicant claims, under 35 U.S.C. §§120 and 365, the benefit of priority of the filing date of Sep. 27, 2008 of a Patent Cooperation Treaty patent application, copy attached, Ser. No. PCT/EP2008/008245, filed on the aforementioned date, the entire contents of which are incorporated herein by reference, wherein Patent Cooperation Treaty patent application Ser. No. PCT/EP2008/008245 was not published under PCT Article 21(2) in English.

Applicant claims, under 35 U.S.C. §119, the benefit of priority of the filing date of Oct. 20, 2007 of a German patent application, copy attached, Ser. No. 10 2007 050 253.4, filed on the aforementioned date, the entire contents of each of which are incorporated herein by reference.

BACKGROUND OF THE INVENTION

1. Field of the Invention

The present invention relates to a detector element array for an optical position measuring instrument.

2. Description of the Related Art

Known position measuring instruments typically include a scale as well as a scanner unit that can be moved relative to the scale in a measuring direction. The scanning unit and the scale are connected to objects whose relative and/or absolute position to one another is to be determined. In the case of a length measurement, the scale is embodied as a linear ruler, with a graduation extending in the measuring direction; in the case of a rotational measurement, the scale is embodied as a graduated plate with a circular-annular graduation. As a rule, in addition to one or more light sources and optical elements, such as lenses, scanning gratings, etc., the scanner unit further includes a detector arrangement. Via the detector arrangement, in the case of an incremental position measuring instrument, a periodic fringe pattern is scanned in a detector plane and is modulated as a function of the relative motion of the scale and the scanner unit. At the output of the detector arrangement, scanning signals modulated as a function of displacement are available for further processing in a downstream electronic unit.

In the detector arrangement, so-called detector element arrays are increasingly used. Such detector element arrays include a plurality of narrow, usually rectangular photodiodes, which are disposed adjacent one another in the measuring direction and are suitably interconnected. Typically, those photodiodes that while scanning the scale furnish in-phase scanning signals are interconnected.

However, the design and adaptation of such detector element arrays to different scanning configurations involves relatively major effort and expense. Therefore, there has long been the need to provide a detector element array of this kind for the most various scanning configurations, to which the detector element array can be adapted flexibly.

For instance, from European Patent Disclosure EP 1 308 700 A2 of the present Applicant, it is known that with the aid of a suitably embodied detector element array, scales with a different graduation period or resolution can be scanned. Moreover, in European Patent Disclosure EP 1 630 528 A2, it is disclosed how, again with the help of a single detector element array, circular scales with different radii can be scanned. In both cases, a detector element array with elongated photodiodes is provided, and the photodiodes are adaptable to various scanning configurations by means of suitable interconnection. The adaptability of the particular detector element arrays to various scanning configurations, however, is possible to only a limited extent.

From German Patent DE 197 54 626 C2 in the same generic field, on which the preamble to claim 1 of the present application is based, a programmable, optically sensitive circuit is furthermore known which enables an even more clearly flexible design of a detector element array for various scanning configurations. To that end, the corresponding circuit or the detector element array has a matrix-like arrangement of individual detector elements and optically sensitive components. In the exemplary embodiments shown, each detector element is associated with four switches, via which each detector element is selectively connectable to four detector elements that are directly adjacent it horizontally and vertically. Each switch is moreover associated with one memory element, in which information can be stored that indicates with which detector elements, via the respective switches, the respective detector element in the established scanning configuration is connected. The provisions proposed in this reference do make even further-improved flexible adaptation of the detector element array to various scanning configurations possible, but because of the many switches and memory elements, it necessitates relatively high effort and expense for circuitry. For instance, interconnecting two diagonally adjacent detector elements can be done only via a plurality of requisite switches and programmable switching devices. Moreover, because of the complicated circuit, the number of available detector elements per unit of surface area decreases; that is, there is only a relatively low resultant pixel density.

SUMMARY AND OBJECTS OF THE INVENTION

It is therefore an object of the present invention to disclose a detector element array for an optical position measuring instrument which has a high pixel density, is adaptable flexibly to the most various scanning configurations, and does not require major effort and expense for circuitry.

This object is attained according to the present invention by a detector element array for an optical position measuring instrument, by way of such array a fringe pattern resulting in a detector plane can be converted into electrical scanning signals. The detector element array includes a plurality of light-sensitive detector elements disposed in matrix-like fashion in rows and columns. The plurality of light-sensitive detector elements include a first detector element in a first column of the columns, a second detector element in the first column that is adjacent to the first detector element and a third detector element in a second column of the columns that is adjacent to the first column, wherein the third detector element is diagonally adjacent to the first detector element. The detector element array includes a first switch that selectively directly connects the first detector element with the second detector element and a second switch that selectively directly connects the first detector element with the third detector element. The detector element array includes a memory element associated with the first detector element, wherein memory element information is stored in the memory element that indicates which of the second and third detector elements is connected to the first detector element in an established scanning configuration, wherein no more than the first and second switches are associated with the memory element According to the present invention, it is now provided that in particular the number of required switches and thus also of the necessary memory elements per detector element be reduced markedly, in that only direct connectability of different detector elements, to a limited extent, is contemplated. This is possible because it is fundamentally known which fundamental geometries the scanned fringe pattern can have in the various instances of use. In the case of a length measuring device, a parallel fringe pattern is as a rule involved; in the case of a rotational measuring device, typically there is a fringe pattern with angularly disposed fringes. Accordingly, it is sufficient according to the present invention to limit the direct connectability of the detector elements via the switches to these two basic scanning configurations. In particular with regard to scanning an angular fringe pattern, a direct connectability of diagonally adjacent detector elements via a corresponding switch is contemplated.

Thus, as an advantage of the version according to the present invention, in comparison to the prior art, the result is a detector element array of considerably less complexity in terms of circuitry; the number of switches and detector elements as well as memory elements required can be reduced markedly. Moreover, because of the reduced circuit complexity, a higher pixel density is attainable than in arrangements in accordance with the prior art; that is, in the final analysis, substantially increased optical resolution in scanning is obtained. On account of the more-favorable ratio of the available detector element area to the required area of the memory elements and switches, a higher photocurrent yield per unit of detector element area also results. Thus the scanning produces better signal quality for the same total area of the detector element array.

It should furthermore be mentioned that the detector element array of the present invention can naturally be used not only in connection with incremental position measuring instruments and periodic graduations but also with absolute position measuring instruments, in which a pseudo-random code is for instance employed for position determination.

The detector element array according to the present invention for an optical position measuring instrument, by way of which array a fringe pattern that results in a detector plane can be converted into electrical scanning signals, includes a plurality of light-sensitive detector elements disposed in matrix-like fashion in rows and columns. At least some of the detector elements are associated with no more than two switches, by way of which the various detector elements are selectively connectable to one or more adjacent detector elements. At least some of the detector elements with associated switches are associated with a memory element, in which information can be stored that indicates which adjacent detector elements, via the no more than two switches, the particular detector element is directly connected to in an established scanning configuration. Via the two switches, selectively, a direct connection to an adjacent detector element in the same column and/or a direct connection to a diagonally adjacent detector element in an adjacent column of an adjacent row can be made.

Advantageously, laterally adjacent to the detector element array, a plurality of connecting lines are disposed, with which a respective group of detector elements, connected via the switches, can be connected.

It is possible here for the detector elements of one group to generate respective in-phase scanning signals by scanning the fringe pattern.

In one possible embodiment, a channel multiplexer is disposed between the connecting lines and the detector element array, by way of which channel multiplexer the connected detector elements of the groups with in-phase scanning signals can each be switched to the same connecting line.

The detector elements can be interconnected in such a way that four scanning signals with a phase offset of 90° are located on four connecting lines, or three scanning signals phase-offset by 120° are located at three connecting lines.

It is possible that each memory element is connected to the two switches via a respective control line.

Each memory element can have one inverting and noninverting output, and each of the outputs can be connected to a control line.

Advantageously, programming lines can be disposed between the columns and rows of the detector elements and for triggering the memory elements can be connected to these memory elements in order by way of them to actuate the switches selectively.

For scanning a periodic fringe pattern including parallel fringes, only detector elements in one column can be connected to one another via the switches.

For scanning a periodic fringe pattern including angularly disposed fringes, the detector element array can have two halves, embodied mirror-symmetrically to an axis of symmetry, and looking from the direction of the axis of symmetry,
in a left half, via the two switches, selectively,
a connection can be made with an adjacent detector element in the same column, and/or
a connection can be made with an adjacent detector element in an adjacent column on the left of a row above it and adjacent to it, and
in a right half, via the two switches, selectively,
a connection can be made with an adjacent detector element in the same column, and/or
a connection can be made with an adjacent detector element in an adjacent column on the right of a row above it and adjacent to it.

The memory element can be embodied as one of the following elements: PROM, EPROM, EEPROM, FRAM, MRAM, SRAM, DRAM.

The detector elements can all have an identical outline.

It is possible for the detector elements of adjacent rows to be aligned with one another.

Moreover, it is alternatively possible for the detector elements of adjacent rows to be disposed with a defined offset spacing in the direction in which the rows extend.

In one possible embodiment, the switches and memory elements can be disposed at least partly inside the area of the detector elements.

Moreover, precisely one memory element can alternatively be associated with each switch, for triggering.

Preferably, a position measuring instrument is equipped with a detector element array according to the present invention.

Further details and advantages of the present invention will now be explained in the ensuing description of exemplary embodiments in conjunction with the drawings.

Shown are

DESCRIPTION OF THE PREFERRED EMBODIMENT(S) OF THE INVENTION

Figure 1:
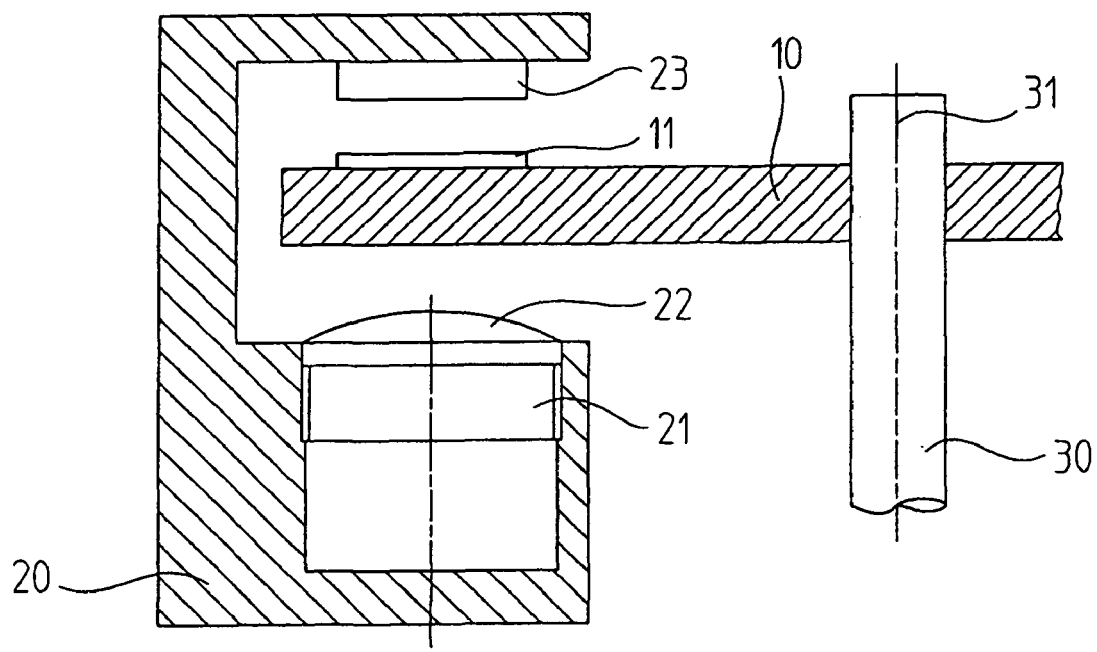
FIG. 1 is a schematic illustration of an embodiment of an optical position measuring instrument, with a detector element array in accordance with the present invention.

In FIG. 1, in a highly schematic illustration, a rotational optical position measuring instrument is shown, which is equipped with the detector element array 23 of the present invention. The position measuring instrument serves to generate position information regarding the relative motion of an object, which is not shown in the drawing, rotating about the axis 31. Such an instrument can be employed for instance in machine tools or in electric drive mechanisms, where it furnishes position information about the rotating object for a higher-order control unit.

The position measuring instrument shown includes, first, a graduated plate 10, on which an incremental graduation 11 is disposed. The graduation 11 includes a track, disposed in a circular ring around the axis 31, with alternating transparent and nontransparent regions that are each embodied rectangularly; the nontransparent regions may be provided with a chromium coating, for instance. The graduated plate 10 is centered on a shaft 30, rotating about the axis of rotation 31, and includes glass or plastic. The shaft 30 is connected to a rotating object, for instance to the shaft of an electric drive mechanism.

Second, the position measuring instrument includes a scanner unit 20, which in the present example is disposed stationary relative to the rotating graduated plate 10. The scanner unit 20 includes a light source 21, with a preceding collimator element 22, and the detector element array 23, embodied according to the present invention, and these are placed for instance in a suitable housing.

In the exemplary embodiment shown, with so-called transmitted-light scanning, the graduated plate 10 or in other words the graduation 11 is disposed between the light source 21 and the detector element array 23. After the light is shone through the graduation 11, the result in the detector plane in this example is a periodic fringe pattern in the shadow cast, which in the case of rotation of the graduated plate 10 about the axis 31 is modulated as a function of displacement and is detected via the detector element array 23 disposed in the detector plane and converted into suitable scanning signals. The resultant position-dependent scanning signals, for instance two incremental signals phase offset by 90°, are further processed in the known manner in a control unit, not shown.

At this point, it will expressly be pointed out that the detector element array 23 of the present invention is understood also to be usable in other position measuring instruments than in the rotational variant shown. For instance, the provisions according to the invention enable in particular the use of the detector element array 23 that is identical in terms of hardware in a linear position measuring instrument. In that case, a linearly extending graduation is scanned by a scanner unit with the same detector element array 23, which then has a scanning configuration that is adjusted to the linear situation.

Naturally, the use of the detector element array of the present invention is not limited to the transmitted-light scanning shown, either; instead, it can also be employed with incident light scanning.

It should be pointed out that the creation of the fringe pattern in the detector plane need not necessarily be done—as in the example of FIG. 1 described—in the cast shadow; instead, such fringe patterns can also be created via other interacting mechanisms between the focused beams furnished by a light source and one or more gratings in the scanning beam path.

Figure 2:
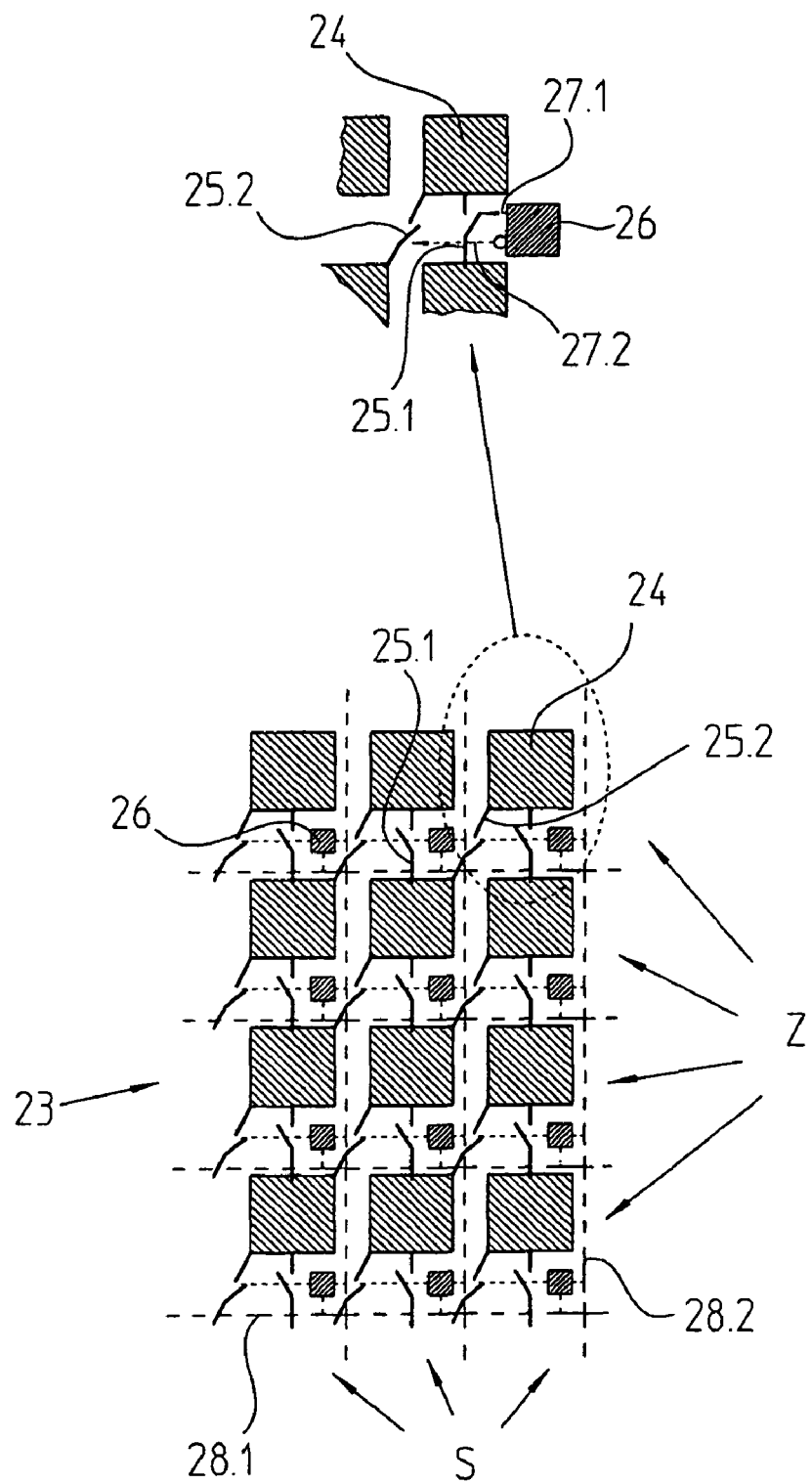
FIG. 2 shows a detail of one exemplary embodiment of the detector element array of FIG. 1 in accordance with the present invention, in a schematic illustration in conjunction with an enlarged detail view of it.

In FIG. 2, a fragmentary view is shown of the detector element array 23 of FIG. 1, along with an enlarged view of a detail thereof. From these views, the basic construction of the detector element array 23 of the present invention will now be described.

The detector element array 23 of the present invention includes a plurality of light-sensitive detector elements 24, which are disposed in matrix-like fashion in rows Z and columns S and are embodied for instance as photodiodes. The detector elements 24 of adjacent rows Z, in the variant shown, are all disposed in aligned fashion to one another.

In the embodiment shown of a detector element array 23 of the present invention, the detector elements 24 each have an identical, square outline; fundamentally, it is naturally possible for other geometries to be employed for the outlines in question, such as rectangular, trapezoidal, or elliptical outlines, and so forth.

At least some of the detector elements 24 of the detector element array 23 are in the general case each associated with no more than two, and in the present example precisely two, switches 25.1, 25.2, by way of which the respective detector element 24 is selectively connectable directly to two adjacent detector elements 24. As will become apparent from the example of FIG. 4 to be described hereinafter, individual detector elements 24 that need not necessarily be associated with such switches 25.1, 25.2 can be disposed for instance in the boundary rows Z and columns S of the detector element array 23. According to the present invention, via the two switches 25.1, 25.2, a direct connection with an adjacent detector element 24 in the same column S and/or a direct connection with a diagonally adjacent detector element 24 in an adjacent column S of an adjacent row Z can be selectively established. The latter situation is especially advantageous for scanning angular graduations in rotational systems.

For the example shown in the lower half of FIG. 2, this means that the detector element 24 in the middle column S and in the second row Z from the top, for example, is connectable via the switch 25.1 directly to the detector element 24 disposed above it in the same column S in the adjacent (first) row Z; conversely, via the switch 25.2, that detector element 24 can be connected directly to the detector element 24 located diagonally above it in the adjacent (right-hand) column S in the adjacent (first) row Z. In a distinction from the prior art, because of the direct connection of adjacent detector elements 24 via the two switches 25.1, 25.2, complex interconnection logic elements are dispensed with; that is, the result is a significantly simplified construction.

The switches for the direct (vertical) connection of adjacent detector elements 24 of different rows Z but the same column S will all be provided hereinafter with reference numeral 25.1; the switches for the direct (diagonal) connection of adjacent detector elements 24 of adjacent rows Z and adjacent columns S will be provided in this example with the reference numeral 25.2.

In the detector element array 23 of the present invention, accordingly only two switches 25.1, 25.2 per detector element 24 are provided, for establishing different scanning configurations. The two definitive scanning configurations are at least one scanning configuration for a fringe pattern in the detector plane that includes only fringes disposed parallel to one another in the column direction, and a second scanning configuration in which the scanned fringe pattern includes fringes disposed angularly to one another.

It is understood to be possible to adapt the detector element array 23 of the present invention to the two aforementioned scanning configurations with different geometric parameters of the corresponding fringe patterns. This means for instance that parallel fringe patterns in the detector plane can be scanned with different fringe pattern periodicities using a suitably adapted detector element array 23; angularly oriented fringe patterns with different angles can equally well be scanned with a suitably adapted detector element array 23 of the present invention.

Accordingly, in the various scanning configurations, via the switches 25.1, 25.2, the detector elements 24 are connected to one another in different interconnection variants, depending on the geometry of the graduation to be scanned with them in the detector plane. The result is a plurality of groups of detector elements 24 connected to one another, which in the scanning of a graduation modulated as a function of displacement generate scanning signals that are phase-shifted relative to one another; within each interconnected group, in-phase scanning signals are applied to each of the detector elements 24. Typically, four such groups are formed, which each includes detector elements 24 that are connected to one another via the corresponding switches 25.1, 25.2 and that each furnish scanning signals phase offset by 90°. As an alternative, it is also possible for three groups of interconnected detector elements to be provided, which furnish 120° phase-offset scanning signals, or a suitable interconnection for scanning pseudo-random codes, gray codes, or reference markings on the side of the scale.

The detector elements 24 of each group are electrically conductively connected to a connecting line that is not shown in FIG. 2. The four or three connecting lines of the various groups are for instance disposed laterally adjacent to the detector element array 23. Moreover, between the detector element array 23 and the connecting lines, there is preferably a channel multiplexer, by way of which the connected detector elements 24 of one group, with in-phase scanning signals, can each be connected to the same connecting line. Within the occupied area of the detector element array 23, accordingly no further connecting lines are necessary in the example shown, since within the detector element array 23, the connected detector elements 24 function as conducting elements for the generated photocurrents. Via the connecting lines, the scanning signals of the various groups are delivered to a downstream electronic unit for further processing.

Each detector element 24 in the detector element array 23 of the present invention is also associated with one memory element 26, in which information is stored that indicates with which adjacent detector elements 24 a certain detector element 24 in an established scanning configuration is directly connected via the two switches 25.1, 25.2. Accordingly, the memory elements 26 serve to trigger the two switches 25.1, 25.2 and also serve to store the information about which switching states for the two switches 25.1, 25.2 are activated just at that time in that particular scanning configuration.

As can be seen from the enlarged detail in FIG. 2, for that purpose each memory element 26 is connected to one of the two associated switches 25.1, 25.2, via a respective control line 27.1, 27.2. In the exemplary embodiment shown, the memory element 26 has one inverting and one noninverting output, with each of which a respective one of the two control lines 27.1, 27.2 is connected.

In order to enable triggering the memory elements 26, or causing them to respond, in the detector element array 23 of the present invention via a higher-order control logic, the detector element array 23 also has programming lines 28.1, 28.2 disposed between the columns S and rows Z of the detector elements 24. Horizontally extending programming lines for the various rows of the detector element array 23 are identified by reference numeral 28.1, and the vertically extending programming lines for the various columns of the detector element array 23 are identified by reference numeral 28.2.

In the detector element array 23 of the invention, PROMs, EPROMs, EEPROMs, FRAMs, MRAMs, SRAMs, DRAMs, etc. can be considered for the memory elements 26. Accordingly, both volatile and nonvolatile memory elements can be employed; in the case of volatile memory elements 26, it must then merely be ensured that the information of the memory elements 26 is stored in a separate memory unit, so that in the event that a system restart becomes necessary after a power interruption, they will be available again for a certain scanning configuration.

Alternatively to the variant explained with one memory element per detector element and two switches, it is also possible within the scope of the present invention to make one memory element per switch available. In that case, precisely one switch is triggered via one memory element. In the case of such an embodiment, the aforementioned inversion within a memory element would then be omitted.

Two further alternative embodiments of a detector element array of the present invention will now be explained in terms of the schematic detailed views in FIGS. 3a and 3b. Each of these figures shows a single detector element 340, 440 along with associated switches 350.1, 350.2, 450.1, 450.2, memory elements 360, 460, and control lines 370, 470, respectively, of these embodiments of detector element arrays of the present invention.

Figure 3A:
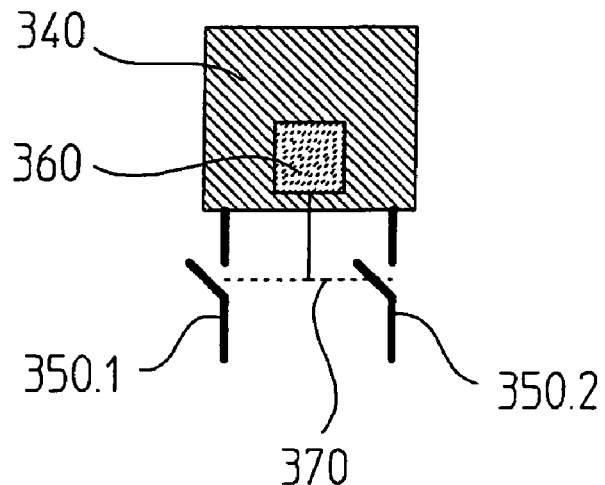
FIG. 3 is an enlarged view of an alternative exemplary embodiment of a detector element array to be used with the optical position measuring instrument of FIG. 1 in accordance with the present invention.
Figure 3B:
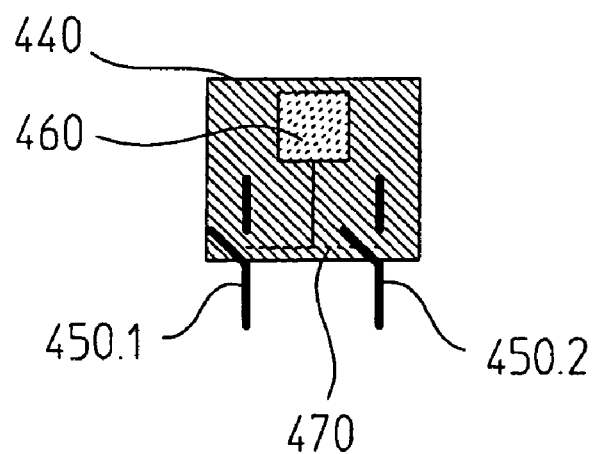

While in the above-described example of FIG. 2, the components associated with the detector elements were all disposed outside the area occupied by the detector elements, it is now provided in the example of FIG. 3a that the memory element 360 be disposed in the region of the area of the detector element 340; the two associated switches 350.1, 350.2 are located outside that region, adjacent to the detector element.

In the example of FIG. 4a, in addition to the memory element 460, the switches 450.1, 450.2 and the control line 470 are also disposed in the region of the area of the detector element 440.

It is accordingly possible within the scope of the present invention to dispose the switches and memory elements in the detector element array at least partly inside the area of the detector elements. In that manner, a compact embodiment of the detector element array is possible which at the same time ensures a high pixel density per unit of surface area. The switches and memory elements do not substantially affect the function of the detector elements here.

Figure 4:
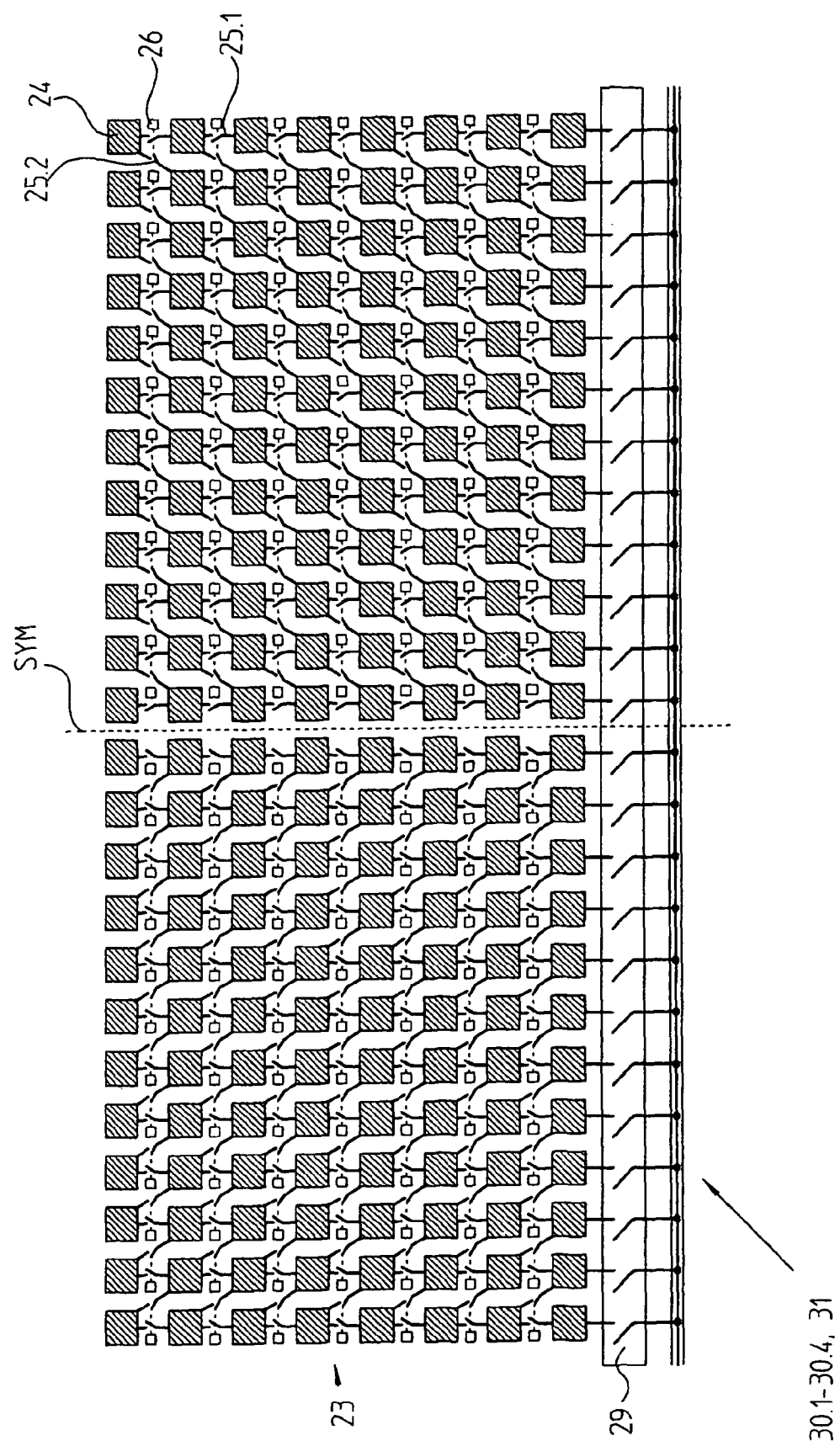
FIG. 4 is a complete view of a further embodiment of a detector element array to be used with the optical position measuring instrument of FIG. 1 in accordance with the present invention.

FIG. 4, finally, shows the complete detector element array 23, as it has already been partly described in both FIGS. 1 and 2. The detector element array 23 shown includes a total of 192 detector elements 24, which as described above are disposed in matrix-like fashion in 8 rows and 24 columns. While the programming lines have not been shown in this view for the sake of greater simplicity, a total of five connecting lines 30.1-30.4, 31 have been indicated schematically in the lower peripheral region of the detector element array 23. Those detector elements 24 which in the scanning of a fringe pattern furnish in-phase scanning signals are each connected to a respective connecting line 30.1-30.4. In the interconnected state, the connecting line 30.1 for instance furnishes the so-called 0° scanning signal, the connecting line 30.2 furnishes the so-called 90° scanning signal, the connecting line 30.3 furnishes the so-called 180° scanning signal, and the connecting line 30.4 furnishes the so-called 270° scanning signal. Between the connecting lines 30.1-30.4 and the detector elements 24—as already indicated above—is the channel multiplexer 29, by way of which the various groups of connected detector elements 24 with in-phase scanning signals are each connected to the same connecting line 30.1-30.4.

A fifth connecting line 31 serves for instance to combine detector elements 24 that in scanning angular fringe patterns, for instance, do not furnish usable scanning signals with a defined phase relationship.

As can be seen from FIG. 4, the detector elements 24 of this detector element array 23 that are disposed to the left and right of a line of symmetry S, each have differently disposed switches 25.2, which connect each detector element 24 to a diagonally adjacent detector element 24 in a different column and a different row. The switches 25.1 for optional connection of adjacent detector elements of one column are identical in the portions of the detector element array to the left and right of the line of symmetry S.

In the left portion of the detector element array, the switches 25.2 of the detector elements 24 are each disposed at the upper left corner of the detector elements 24. This means that by way of them—viewed from the line of symmetry S outward—each inner detector element 24 can be connected to the detector element 24 above it (diagonally) on the left of the adjacent row and the adjacent column, in a corresponding scanning configuration. Alternatively to this disposition of the switches 25.2, it is understood that it would also be possible to dispose these switches at the lower right corner of the detector elements 24, in order to combine detector elements 24 with detector elements 24 in an adjacent row and in an adjacent column.

Conversely, in the right portion of the detector element array, the switches 25.1 of the detector elements 24 are each disposed at the upper right corner of the detector elements 24. This means that by way of them—viewed from the line of symmetry S outward—each inner detector element 24 can be connected to the detector element 24 above it (diagonally) on the left of the adjacent row and the adjacent column, in a corresponding scanning configuration. Here as well, alternatively to this disposition of the switches 25.2, it is understood that it would also be possible to dispose these switches 25.2 at the lower left corner of the detector elements 24, in order to combine detector elements 24 with detector elements 24 in an adjacent row and in an adjacent column.

In conjunction with FIGS. 5a and 5b, it will now be described how the detector element array 23 of FIG. 4 is interconnected in two different scanning configurations. In both FIGS. 5a and 5b, interconnected detector elements 24 of the detector element array 23 which in the scanning of the various fringe patterns generate in-phase scanning signals are identified in the same way.

Figure 5A:
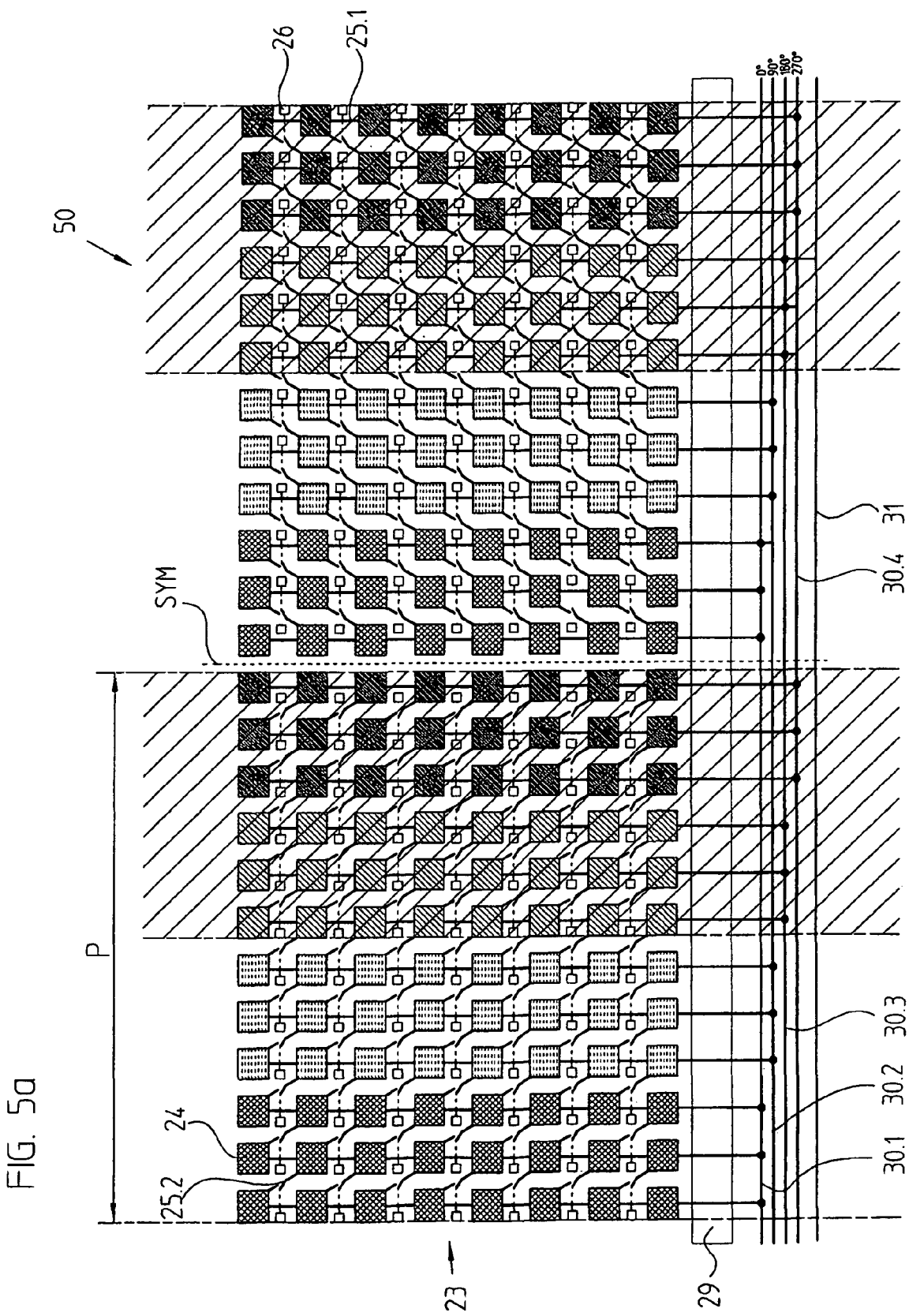
FIG. 5a shows the detector element array of FIG. 4, in an interconnection state that is suitable for scanning a linear fringe pattern in the detector plane.

FIG. 5a shows the corresponding detector element array 23, interconnected in a scanning configuration for a parallel fringe pattern 60 that results in the detector plane and has a periodicity P. As can be seen, in this scanning configuration, all the switches 25.1 that connect the detector elements 24 of one column to one another are closed, while all the other switches 25.2 are open. Each three adjacent columns of detector elements 24 are connected via the channel multiplexer 29 to one common connecting line 30.1-30.4. The first three columns, viewed from the left, of detector elements 24 that are within a half period P of the fringe pattern 50 furnish the 0° scanning signal on the connecting line 30.1; the detector elements 24 of the fourth through sixth columns furnish the 90° scanning signal on the connecting line 30.2; the detector elements 24 of the seventh to ninth columns furnish the 180° scanning signal on the connecting line 30.3; the detector elements of the tenth to twelfth columns furnish the 270° scanning signal on the connecting line 30.4; and the detector elements 24 of the next three columns furnish a 0° scanning signal and are connected to the connecting line 31.1 again, and so forth.

It is understand that as an alternative to this, some other groupwise interconnection of the columns may be made.

A scanning configuration of this kind of the detector element array 23 of the invention can be used for instance whenever the array 23 is used in the scanner unit of a linear position measuring instrument, and a parallel fringe pattern in a detector plane is to be detected and converted into displacement-dependent, phase-shifted scanning signals.

The detector element array 23 that in terms of hardware is identical can now be used also in a scanning configuration if an angular fringe pattern in the detector plane is to be scanned. FIG. 5b shows the detector element array 23 in such a scanning configuration, along with the angular fringe pattern 60, which has an angle periodicity $\Theta$. An angular graduation 60 of this kind can result for instance in the case of a rotational position measuring instrument from the interaction of focused beams with one or more gratings in the scanning beam path, for instance if at least one of these gratings is embodied rotationally symmetrically.

Figure 5B:
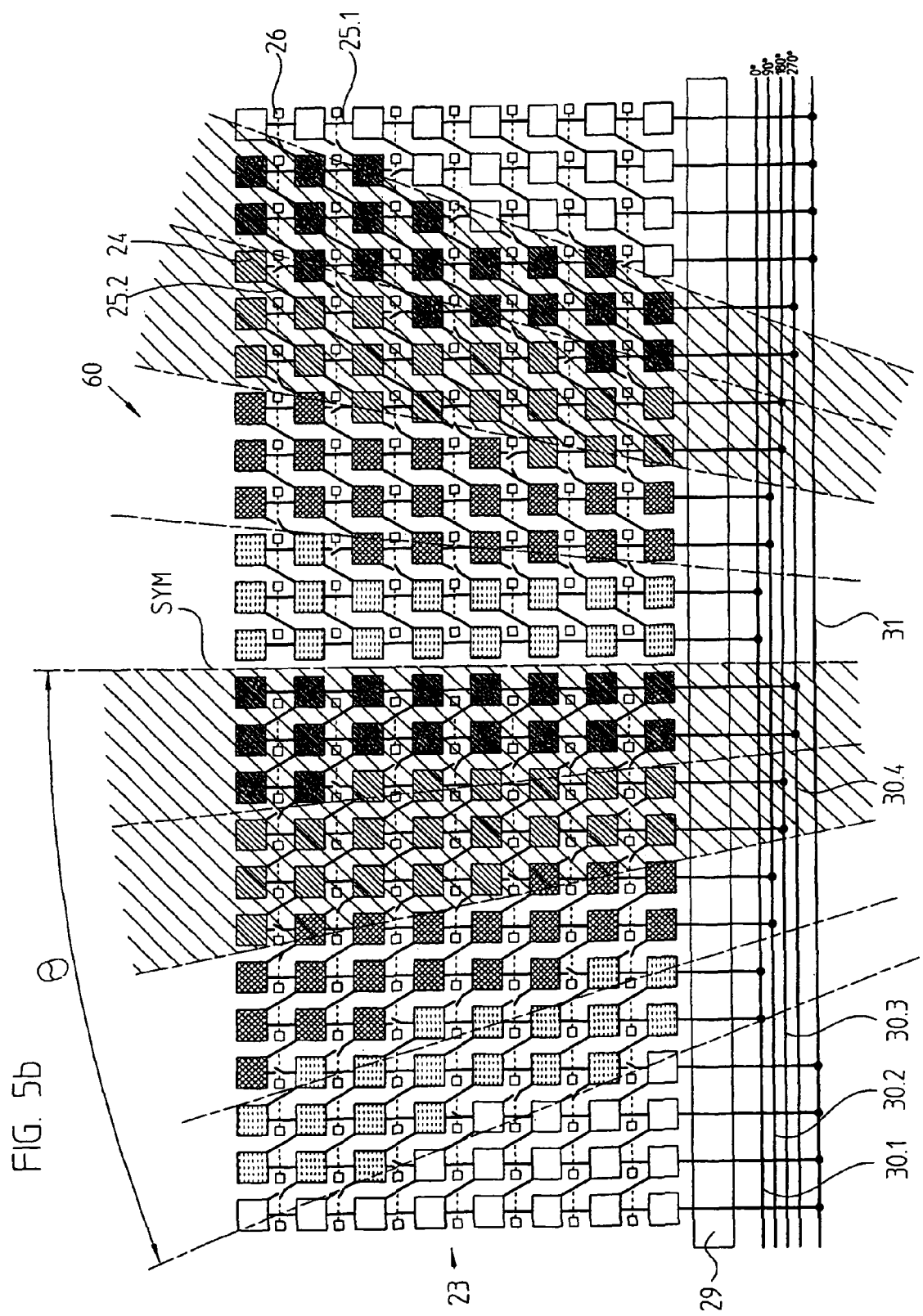
FIG. 5b shows the detector element array of FIG. 4, in an interconnection state that is suitable for scanning an angular fringe pattern in the detector plane.

As can be seen from FIG. 5b, in both halves of the detector element array to the left and right of the line of symmetry SYM, because of the angular fringe pattern 60, a different interconnection of the various detector elements 24 is provided. Thus in the left half of the detector element array 23, via the two switches 25.1, 25.2, a connection to an adjacent detector element 24 in the same column and/or a connection to a diagonally adjacent detector element 24 in a adjacent column on the left of a row above and adjacent it is selectively made. In the right half of the detector element array 23, conversely, via the two switches 25.1, 25.2, a connection with an adjacent detector element 24 in the same row and/or a connection with a diagonally adjacent detector element 24 in an adjacent column on the right of a row above and adjacent to it is selectively made.

The interconnected detector elements located in a one-half angle period $\Theta/2$ of the fringe pattern 60 are connected via the channel multiplexer 29 to a common connecting line 30.1-30.4, so that on the output side, once again four phase-offset scanning signals are available, in the form of a 0° scanning signal, a 90° scanning signal, a 180° scanning signal, and a 270° scanning signal.

In the case of a scanning configuration for an angular fringe pattern, it has moreover proved advantageous if the peripheral detector elements 24 in the detector element array 23 of the invention are not used for scanning the fringe pattern but instead are combined on the connecting line 31. Otherwise, errors regarding the desired phase relationships of the various scanning signals would result.

In addition to the example described in detail, within the scope of the present invention there are naturally still further possibilities for embodying the detector element array of the invention.

Figure 6:
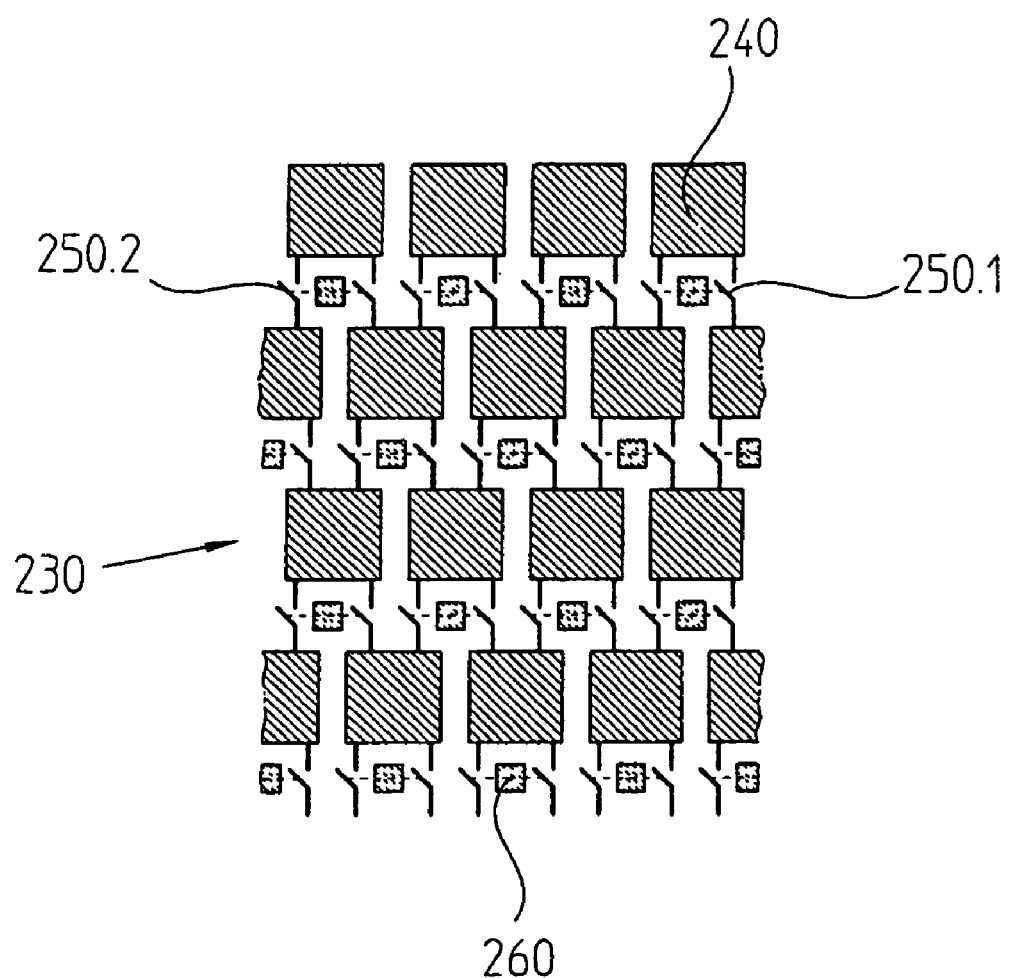
FIG. 6 is a complete view of a further embodiment of a detector element array to be used with the optical position measuring instrument of FIG. 1 in accordance with the present invention.

A detail of a further variant of a detector element array of the present invention is shown in FIG. 6. This variant differs from that explained above essentially in the disposition of the detector elements 240. While in the above example the detector elements of adjacent rows are aligned with one another, in the present variant it is provided that the detector elements of adjacent rows are disposed with a certain offset spacing from one another in the direction in which the rows extend. At least some of the detector elements 24 are again each associated with two switches 250.1, 250.2, which make it possible to connect the particular detector element 240 with detector elements 240 located diagonally below and above them, depending on the scanning configuration required. Once again, as described above, the triggering of the switches 250.1, 250.2 takes place with the aid of a memory element 260, which is associated for instance with some of the detector elements 240. An especially advantageous aspect of this variant to be mentioned is that with it a simpler layout and a possibly higher pixel density are attainable.

With a view to further alternative embodiments of the detector element array of the present invention, it should be noted that the interconnection of the detector elements and the scanning configuration established for a particular scanning variant need not necessarily be static. For instance, with the aid of the detector element array of the present invention, it is possible even during operation of the position measuring instrument thus equipped to alter the particular scanning configuration, for instance in order to perform a dynamic adaptation to varying scanning conditions. Thus in this way adaptation of a scanning configuration can for instance be done in the case of a rotational position measuring instrument in which the graduated plate with the scale is not disposed exactly concentrically to the axis of rotation and in which the scanning signals, without such an adaptation, would have an error of eccentricity. Similarly, in the case of a linear position measuring instrument, an error which occurs because of curvature of the scale in its longitudinal direction could be corrected by dynamically, during measurement, adapting the detector element array used to changing scanning conditions.

Besides the exemplary embodiments described concretely, thus further alternative embodiment possibilities are also within the scope of the present invention.

I claim

1. A detector element array for an optical position measuring instrument, by way of such array a fringe pattern resulting in a detector plane can be converted into electrical scanning signals, the detector element array comprising:
    a plurality of light-sensitive detector elements disposed in matrix-like fashion in rows and columns, wherein said plurality of light-sensitive detector elements comprise:
        a first detector element in a first column of said columns;
        a second detector element in said first column that is adjacent to said first detector element; and
        a third detector element in a second column of said columns that is adjacent to said first column, wherein said third detector element is diagonally adjacent to said first detector element;
    a first switch that selectively directly connects said first detector element with said second detector element;
    a second switch that selectively directly connects said first detector element with said third detector element; and
    a memory element associated with said first detector element, wherein memory element information is stored in said memory element that indicates which of said second and third detector elements is connected to said first detector element in an established scanning configuration.

2. The detector element array as defined by claim 1, further comprising a plurality of connecting lines disposed laterally adjacent to said detector element array, wherein said first, second and third detector elements are selectively connected to said plurality of connecting lines via said first and second switches so that at least a first group of detector elements or a second group of detector elements are formed.

3. The detector element array as defined by claim 2, wherein said first group of detector elements generate respective in-phase scanning signals when said fringe pattern is scanned.

4. The detector element array as defined by claims 3, further comprising a channel multiplexer disposed between said connecting lines and said detector element array, by way of which detector elements of said first group of detector elements are each switched to a common one of said plurality of connecting lines.

5. The detector element array as defined by claim 4, wherein said detector elements of said first group of detector elements are interconnected in such a way that four scanning signals phase offset by 90° are located on four of said plurality of connecting lines.

6. The detector element array as defined by claim 4, wherein said detector elements of said first group of detector elements are interconnected in such a way that three scanning signals phase-offset by 120° are located at three connecting lines.

7. The detector element array as defined by claim 1, wherein said memory element is connected to said first switch and said second switch via a respective control line.

8. The detector element array as defined by claim 7, wherein said memory element comprises an inverting output and a noninverting output, and each of said inverting and said noninverting outputs is connected to said control line.

9. The detector element array as defined by claim 1, further comprising a programming line disposed between columns and rows of said detector elements, wherein said programming line is connected to said memory element so as to selectively actuate said first and second switches.

10. The detector element array as defined by claim 1, wherein in that for scanning a periodic fringe pattern comprising parallel fringes, only said first and second detector elements are connected to one another via said first switch.

11. The detector element array as defined by claim 1, wherein in that for scanning a periodic fringe pattern comprising angularly disposed fringes, the detector element array comprises a left half and a right half, embodied mirror-symmetrically to an axis of symmetry, and looking from a direction of said axis of symmetry the following connections can be achieved:
    1) in said left half, said first, second and third detector elements are present and via said first and second switches, selectively,
        a) a connection can be made with said first detector element and said second detector element; and/or
        b) a connection can be made with said first detector element and said third detector, wherein said third detector element is left and above said first detector element;
    2) in a right half, comprising:
        a fourth detector element in a third column of said columns;
        a fifth detector element in said third column that is adjacent to said fourth detector element; and
        a sixth detector element in a fourth column of said columns that is adjacent to said third column, wherein said sixth detector element is diagonally adjacent to said third detector element;

a third switch that selectively directly connects said fourth detector element with said fifth detector element;
a fourth switch that selectively directly connects said fourth detector element with said sixth detector element; and
wherein via said third and fourth switches, selectively,
a) a connection can be made with said fourth detector element and said fifth detector element, and/or
b) a connection can be made with said fourth detector element and said sixth detector, wherein said sixth detector element is right and above said third detector element.

12. The detector element array as defined in claim 1, wherein said memory element is a type selected from the group consisting of PROM, EPROM, EEPROM, FRAM, MRAM, SRAM and DRAM.

13. The detector element array as defined in claim 1, wherein each of said first, second and third detector elements have an identical outline.

14. The detector element array as defined by claim 1, wherein detector elements of adjacent rows are aligned with one another.

15. The detector element array as defined by claim 1, wherein detector elements of adjacent rows are disposed with a defined offset spacing in a direction in which said adjacent rows extend.

16. The detector element array as defined by claim 1, wherein said first and second switches and said memory element is disposed at least partly inside an area of said first detector element.

17. The detector element array as defined by claim 1, wherein each of said first and second switches is associated only with said memory element.

18. A position measuring instrument, comprising:
a graduation comprising a fringe pattern;
a scanner that generates light that scans said fringe pattern;
a detector element array positioned at a detector plane that receives light from said graduation and converts said received light into electrical scanning signals, said detector element array comprising:
a plurality of light-sensitive detector elements disposed in matrix-like fashion in rows and columns, wherein said plurality of light-sensitive detector elements comprise:
a first detector element in a first column of said columns;
a second detector element in said first column that is adjacent to said first detector element; and
a third detector element in a second column of said columns that is adjacent to said first column, wherein said third detector element is diagonally adjacent to said first detector element;
a first switch that selectively directly connects said first detector element with said second detector element;
a second switch that selectively directly connects said first detector element with said third detector element; and
a memory element associated with said first detector element, wherein memory element information is stored in said memory element that indicates which of said second and third detector elements is connected to said first detector element in an established scanning configuration.

* * * * *